US008516457B2

(12) United States Patent (10) Patent No.: US 8,516,457 B2
Dhoolia et al. (45) Date of Patent: Aug. 20, 2013

(54) METHOD, SYSTEM AND PROGRAM STORAGE DEVICE THAT PROVIDE FOR AUTOMATIC PROGRAMMING LANGUAGE GRAMMAR PARTITIONING

(75) Inventors: Pankaj Dhoolia, Dadri (IN); Mangala G. Nanda, New Delhi (IN); Krishna Nandivada Venkata, Bangalore (IN); Diptikalyan Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/170,888

(22) Filed: Jun. 28, 2011

(65) Prior Publication Data

US 2013/0007722 A1 Jan. 3, 2013

(51) Int. Cl.
 *G06F 9/45* (2006.01)
(52) U.S. Cl.
 USPC ............ 717/143; 717/142; 717/140; 717/141
(58) Field of Classification Search
 None
 See application file for complete search history.

(56) References Cited

U.S. PATENT DOCUMENTS

| | | | |
|---|---|---|---|
| 6,792,576 | B1 | 9/2004 | Chidlovskii |
| 7,266,491 | B2 * | 9/2007 | Humphreys et al. ............... 704/4 |
| 7,406,685 | B2 * | 7/2008 | Fleehart et al. ............... 717/141 |
| 7,987,458 | B2 * | 7/2011 | Rothman et al. ............... 717/151 |
| 2003/0144978 | A1 | 7/2003 | Zeine |
| 2004/0199374 | A1 | 10/2004 | Wang et al. |
| 2005/0187753 | A1 | 8/2005 | Salter |
| 2008/0281580 | A1 | 11/2008 | Zabokritski |
| 2012/0167065 | A1 * | 6/2012 | Urakhchin ................... 717/143 |

OTHER PUBLICATIONS

Luk et al., "Automatic Grammar Partitioning for Syntactic Parsing," Proceedings of the Seventh International Workshop on Parsing Technologies (IWPT), Oct. 2001, Beijing, China, Tsinghua University Press, ISBN 7-302-04925-4, 11 pages.

Jourdan et al., "Techniques for Improving Grammar Flow Analysis," Lecture Notes in Computer Science, 1990, vol. 432/1990, DOI: 10.1007/3-540-52592-0_67, pp. 240-255.

Javed et al., "Incrementally Inferring Context-Free Grammars for Domain-Specific Languages," ACM, SEKE, 2006, pp. 363-368.

Crepinsek et al., "On Automata and Language Based Grammar Metrics," Advances in Languages, Related Technologies and Applications, ComSIS vol. 7, No. 2, Apr. 2010.

Mernik et al., "Grammar Inference Algorithms and Applications in Software Engineering," IEEE, 2009.

(Continued)

*Primary Examiner* — Isaac Tecklu
*Assistant Examiner* — Hossain Morshed
(74) *Attorney, Agent, or Firm* — Gibb & Riley, LLC

(57) ABSTRACT

Disclosed are embodiments a computer-implemented method, a system and an associated program storage device that provide for automatic programming language grammar partitioning to solve the "code too large" problem. The embodiments partition a particular programming language grammar into logical subsets based on a set of partitioning heuristics and using a dependency graph that is preprocessed so as to be devoid of any cyclically connected grammar rule nodes. For each logical subset, textual code for a corresponding portion of a parsing program can be generated and then converted into machine-readable code for that corresponding portion of the parsing program. Thus, small amounts of textual code for portions of a parsing program are discretely converted into machine-readable code, thereby avoiding the "code too large" problem. The machine-readable code for all portions of the parsing program can then be merged and the parsing program can be executed in order to parse a corpus.

25 Claims, 6 Drawing Sheets

(56) References Cited

OTHER PUBLICATIONS

Dubey et al., "A Deterministic Technique for Extracting Keyword Based Grammar Rules from Programs," ACM, 2006, pp. 1631-1632.

Saha et al., "Gramin: A System for Incremental Learning of Programming Language Grammars," ISEC, India, Feb. 2011.

Katsuhiko Nakamura, "Extending Incremental Learning of Context Free Grammars in Synapse," ICGI, pp. 281-282, 2004.

Nakamura et al., "Incremental Learning of Context Free Grammars Based on Bottom-Up Parsing and Search," Pattern Recognition, 38(9): pp. 1384-1392, 2005.

Alpena Dubey, "Goodness Criteria for Programming Language Grammar Rules," SIGPLAN Notices, 41(12): pp. 44-53, 2006.

Katsuhiko Nakamura, "Incremental Learning of Context Free Grammars by Bridging Rule Generation and Search for Semi Optimum Rule Sets," ICGI, pp. 72-83, 2006.

Dubey et al., "Inferring Grammar Rules of Programming Language Dialects," ICGI, pp. 201-213, 2006.

Dubey et al. "Learning Context-Free Grammar Rules From a Set of Program," IET Software, 2(3): pp. 223-240, 2008.

Imada et al., "Towards Machine Learning of Grammars and Compilers of Programming Languages," ECML PKDD '08: Proceedings of the European Conference on Machine Learning and Knowledge Discovery in Databases—Par II, pp. 98-112, Berlin, Heidelberg, 2008.

* cited by examiner

METHOD, SYSTEM AND PROGRAM STORAGE DEVICE THAT PROVIDE FOR AUTOMATIC PROGRAMMING LANGUAGE GRAMMAR PARTITIONING

BACKGROUND

1. Field of the Invention

The embodiments relate to programming language grammar and, more particularly, to a computer-implemented method, a system and an associated program storage device that provide for automatic programming language grammar partitioning.

2. Description of the Related Art

Software code is typically written in a programming language (e.g., Java, Basic, C, C++, structured query language (SQL), etc.) in a text format and stored (e.g., in a text file). However, to execute the software code it must first be converted from the text format into a machine-readable format (i.e., from textual code into machine-readable code). To accomplish this, textual code for a parsing program is generated by a parsing program generator based on a set of grammar rules, which define the syntactic structure of all strings in the particular programming language. Once the textual code for the parsing program is generated by the parsing program generator, a complier converts (i.e., translates) the textual code into the required machine-readable code for the parsing program (i.e., into an executable parsing program, executed by an operating system or a virtual machine). The executable parsing program (i.e., the parser) is run on target programming language code. Unfortunately, the grammar for programming languages can at times be so large that the resulting textual code for the parsing program is too large to be compiled by the compiler into the required machine-readable code. This problem can be referred to as the "code too large". Thus, there is a need for a computer-implemented method, a system and an associated program storage device to avoid the "code too large" problem.

SUMMARY

In view of the foregoing, disclosed herein are embodiments a computer-implemented method, a system and an associated program storage device that provide for automatic programming language grammar partitioning to solve the "code too large" problem. Specifically, the embodiments partition a particular programming language grammar (i.e., the set of grammar rules for the particular programming language) into logical subsets based on a set of partitioning heuristics and using a dependency graph that is preprocessed so as to be devoid of any cyclically connected grammar rule nodes. For each logical subset, textual code for a corresponding portion of a parsing program can be generated (e.g., by a parsing program generator) and then converted (e.g., by a compiler) into machine-readable code for that corresponding portion of the parsing program. Thus, rather than converting a relatively large amount of textual code for a parsing program into machine-readable code for that parsing program, relatively small amounts of textual code for portions of a parsing program are discretely converted into machine-readable code for portions of that parsing program, thereby avoiding the "code too large" problem. The machine-readable code for all portions of the parsing program can then be merged (e.g., by a code merger) in order to generate a complete executable parsing program (i.e., an executable parser) and the executable parsing program can be executed in order to parse a corpus (e.g., a text file of software code, which is for at least one program and which is written in a particular programming language).

More particularly, disclosed herein are embodiments of a computer-implemented method that provides for automatic programming language grammar partitioning to solve the "code too large" problem.

In one embodiment of this computer-implemented method, a set of grammar rules for a particular programming language can be partitioned into logical subsets based on a dependency graph for the particular programming language, where the dependency graph is preprocessed so as to be devoid of any cyclically connected grammar rule nodes. Then, for each one of the logical subsets, textual code for a corresponding portion of a parsing program can be generated and the textual code can be converted into machine-readable code for that corresponding portion of the parsing program. Finally, all machine-readable code for all portions of the parsing program can be merged in order to generate a complete executable parsing program (i.e., an executable parser) and the executable parsing program can be executed in order to parse a corpus (e.g., a text file of software code, which is for at least one program and which is written in a particular programming language) stored in memory.

Another embodiment of this computer-implemented method is specifically applicable when a programming language grammar has already been partitioned but the resulting partitions (i.e., the subsets of the set of grammar rules) are insufficient (e.g., too large to solve the "code too large" problem or the grammar rules have evolved). In this case, the method can comprise receiving multiple dependency graphs corresponding to subsets of a set of grammar rules for a particular programming language, as previously partitioned (i.e., first subsets). The multiple dependency graphs can be merged into a single dependency graph and the single dependency graph can be preprocessed so that it is devoid of any cyclically connected grammar rule nodes. Next, the set of grammar rules can be repartitioned into logical subsets (i.e., second subsets) based on the single dependency graph, as preprocessed. Then, for each one of the logical subsets (i.e., the second subsets), textual code for a corresponding portion of a parsing program can be generated and the textual code can be converted into machine-readable code for that corresponding portion of the parsing program. Finally, all machine-readable code for all portions of the parsing program can be merged in order to generate a complete executable parsing program (i.e., an executable parser) and the executable parsing program can be executed in order to parse a corpus (e.g., a text file of software code, which is for at least one program and which is written in a particular programming language) stored in memory.

Also disclosed herein are embodiments of system that provides for automatic programming language grammar partitioning to solve the "code too large" problem. This system can comprise at least one memory storing a set of grammar rules for a particular programming language and a corpus (e.g., a text file of software code, which is for at least one program and which is written in a particular programming language). The system can further comprise at least one processor in communication with the memory device(s). The processor(s) can comprise at least the following: a dependency graph processor, a grammar rules partitioner; a parsing program generator; a compiler; and a code merger.

In one embodiment of this system, the grammar rules partitioner can partition the set of grammar rules into logical subsets based on a dependency graph for the particular programming language, where the dependency graph is preprocessed so as to be devoid of any cyclically connected grammar rule nodes. The parsing program generator can then generate, for each one of the logical subsets, textual code for a corresponding portion of a parsing program and the compiler can convert that textual code into machine-readable code for the corresponding portion of the parsing program. Finally, the code merger can merge all machine-readable code for all portions of the parsing program in order to generate a complete executable parsing program (i.e., an executable parser) and the executable parsing program can be executed to parse the corpus.

Another embodiment of this system is specifically applicable when a programming language has already been partitioned but the resulting partitions (i.e., subsets of the set of grammar rules) are insufficient (e.g., too large to solve the "code too large" problem or the grammar rules have evolved). In this case, the dependency graph processor receives multiple dependency graphs corresponding to subsets of a set of grammar rules for a particular programming language, as previously partitioned (i.e., first subsets). The dependency graph processor can further merge those multiple dependency graphs into a single dependency graph and preprocess that single dependency graph to ensure that it is devoid of any cyclically connected grammar rule nodes. After the single dependency graph is preprocessed, the grammar rules partitioner can repartition the set of grammar rules into logical subsets (i.e., second subsets) based on the single dependency graph, as preprocessed. As with the previously described system embodiment, the parsing program generator can generate, for each one of the logical second subsets, textual code for a corresponding portion of a parsing program and the compiler can convert the textual code into machine-readable code for that corresponding portion of the parsing program. Finally, a code merger can merge all machine-readable code for all portions of the parsing program in order to generate a complete executable parsing program (i.e., an executable parser) and the executable parsing program can be executed to parse the corpus.

Also disclosed herein are embodiments of a non-transitory program storage device that is readable by a computer and that tangibly embodies a program of instructions executable by the computer to perform the above-described method.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

Figure 1:
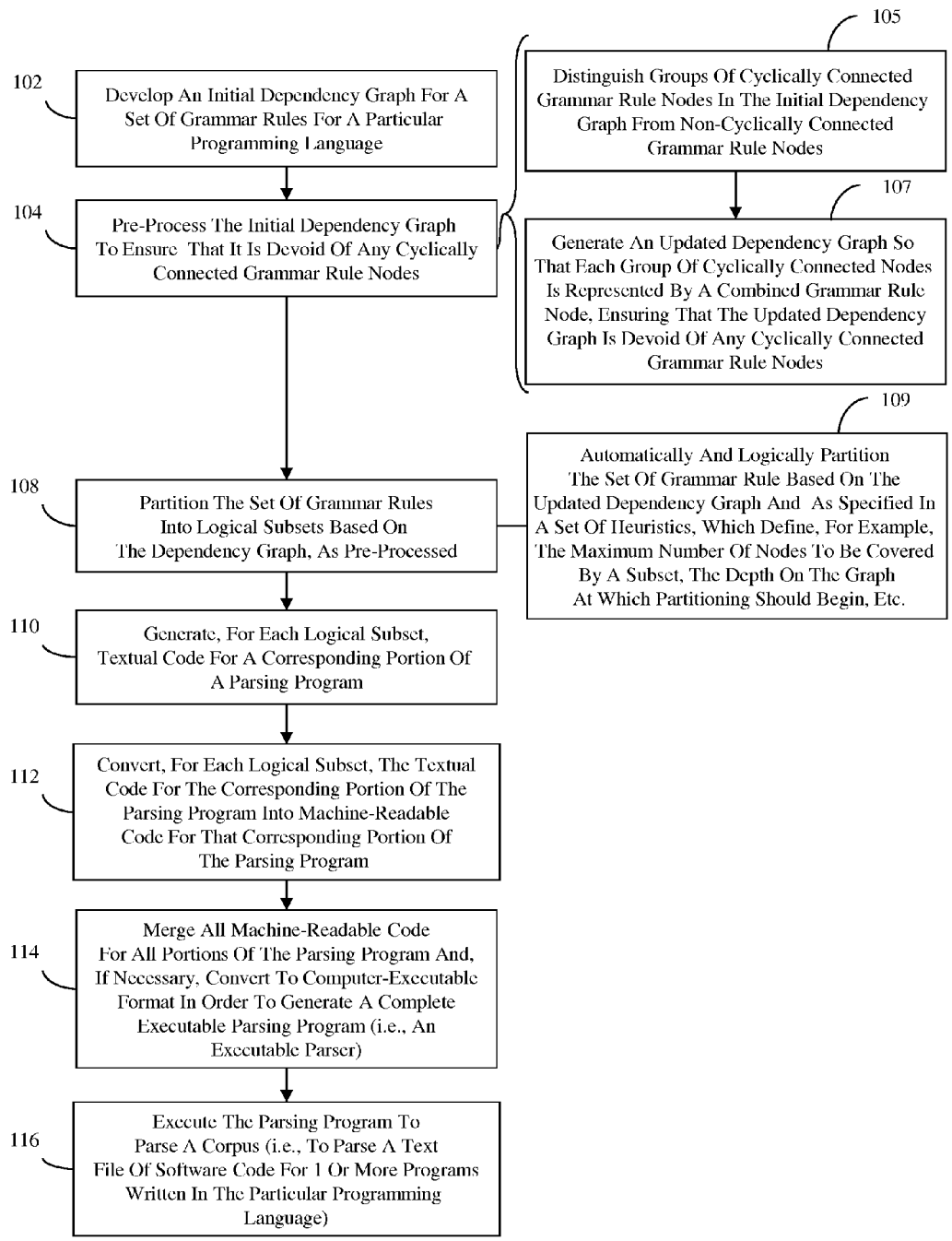
FIG. 1 is a flow diagram illustrating an embodiment of a method that provides for automatic programming language grammar partitioning.

The disclosed embodiments and the various features and advantageous details thereof are explained more fully with reference to the non-limiting embodiments that are illustrated in the accompanying drawings and detailed in the following description.

As mentioned above, software code is typically written in a programming language (e.g., Java, Basic, C, C++, structured query language (SQL), etc.) in a text format and stored (e.g., in a text file). However, to execute the software code it must first be converted from the text format into a machine-readable format (i.e., from textual code into machine-readable code). To accomplish this, textual code for a parsing program is generated by a parsing program generator based on a set of grammar rules, which define the syntactic structure of all strings in the particular programming language. Once the textual code for the parsing program is generated by the parsing program generator, a complier converts (i.e., translates) the textual code into the required machine-readable code for the parsing program (i.e., into an executable parsing program). The machine-readable code for the parsing program (i.e., the parser) is then run on target programming language code. Unfortunately, the grammar for programming languages can at times be so large that the resulting textual code for the parsing program is too large to be compiled by the compiler into the required machine-readable code. This problem can be referred to as the "code too large". Thus, there is a need for a computer-implemented method, a system and an associated program storage device to avoid the "code too large" problem.

In view of the foregoing, disclosed herein are embodiments a computer-implemented method, a system and an associated program storage device that provide for automatic programming language grammar partitioning to solve the "code too large" problem. Specifically, the embodiments partition a particular programming language grammar (i.e., the set of grammar rules for the particular programming language) into logical subsets based on a set of partitioning heuristics and using a dependency graph that is preprocessed so as to be devoid of any cyclically connected grammar rule nodes. For each logical subset, textual code for a corresponding portion of a parsing program can be generated (e.g., by a parsing program generator) and then converted (e.g., by a compiler) into machine-readable code for that corresponding portion of the parsing program. Thus, rather than converting a relatively large amount of textual code for a parsing program into machine-readable code for that parsing program, relatively small amounts of textual code for portions of a parsing program are discretely converted into machine-readable code for portions of that parsing program, thereby avoiding the "code too large" problem. The machine-readable code for all portions of the parsing program can then be merged (e.g., by a code merger) in order to generate a complete executable parsing program (also referred to herein as an executable parser) and the executable parsing program (i.e., the parser) can be executed in order to parse a corpus (e.g., a text file of software code, which is for at least one program and which is written in a particular programming language).

More particularly, disclosed herein are embodiments of a computer-implemented method that provides for automatic programming language grammar partitioning to solve the "code too large" problem.

Referring to FIG. 1, in one embodiment of this computer-implemented method, a set of grammar rules for a particular programming language (e.g., Java, Basic, C, C++, structured query language (SQL), etc.) can be partitioned into logical subsets based on a dependency graph for the particular programming language, where the dependency graph is preprocessed so as to be devoid of any cyclically connected grammar rule nodes (108).

Specifically, this method embodiment can comprise generating an initial dependency graph for the set of grammar rules in a particular programming language (102). Generally, in dependency graphs, grammar rule nodes describe particular non-terminals in the set of grammar rules. For example, consider a grammar rule A-B, C, D. There will be four nodes A, B, C, and D on the graph, if A, B, C, and D are all non-terminals. There will be edges from B to A, C to A and D to A. However, if C is a terminal (i.e., if no other rules exist to further define C), then C will not be represented on the graph.

Figure 2:
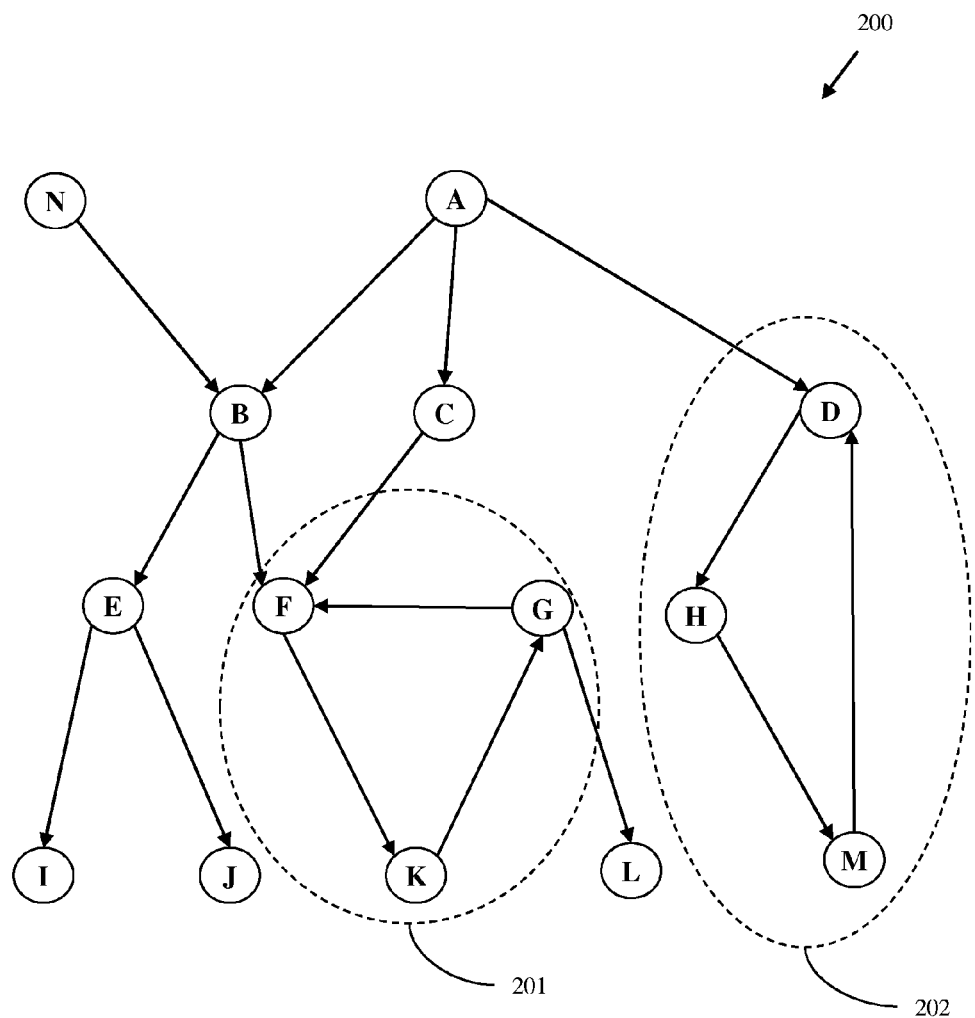
FIG. 2 is an exemplary dependency graph.

FIG. 2 illustrates an exemplary dependency graph 200. In this exemplary dependency graph 200, nodes A-N represent the grammar non-terminals in a set of grammar rules. Nodes A and N are independent grammar rule nodes, as they do not depend on any other nodes. Nodes B-M are dependent grammar rule nodes, as they each depend from at least one other node.

Next, this method embodiment can comprise preprocessing the dependency graph so that it is devoid of any cyclically connected grammar rule nodes (104). This preprocessing can be accomplished by first analyzing the graph in order to identify strongly connected nodes and, particularly, in order to distinguish the groups of cyclically connected grammar rule nodes in the initial dependency graph from non-cyclically connected grammar rule nodes (105). For example, as illustrated in the exemplary dependency graph of FIG. 2, the group 201 of nodes F, K and G are all cyclically connected (i.e., node K depends from node F, node G depends from node K and node F depends from node G), the group 202 of nodes D, H and M are all cyclically connected (i.e., node H depends from node D, node M depends from node H and node D depends from node M) and nodes N, A, B, C, E, I, J and L are not cyclically connected to any other nodes.

Figure 3:
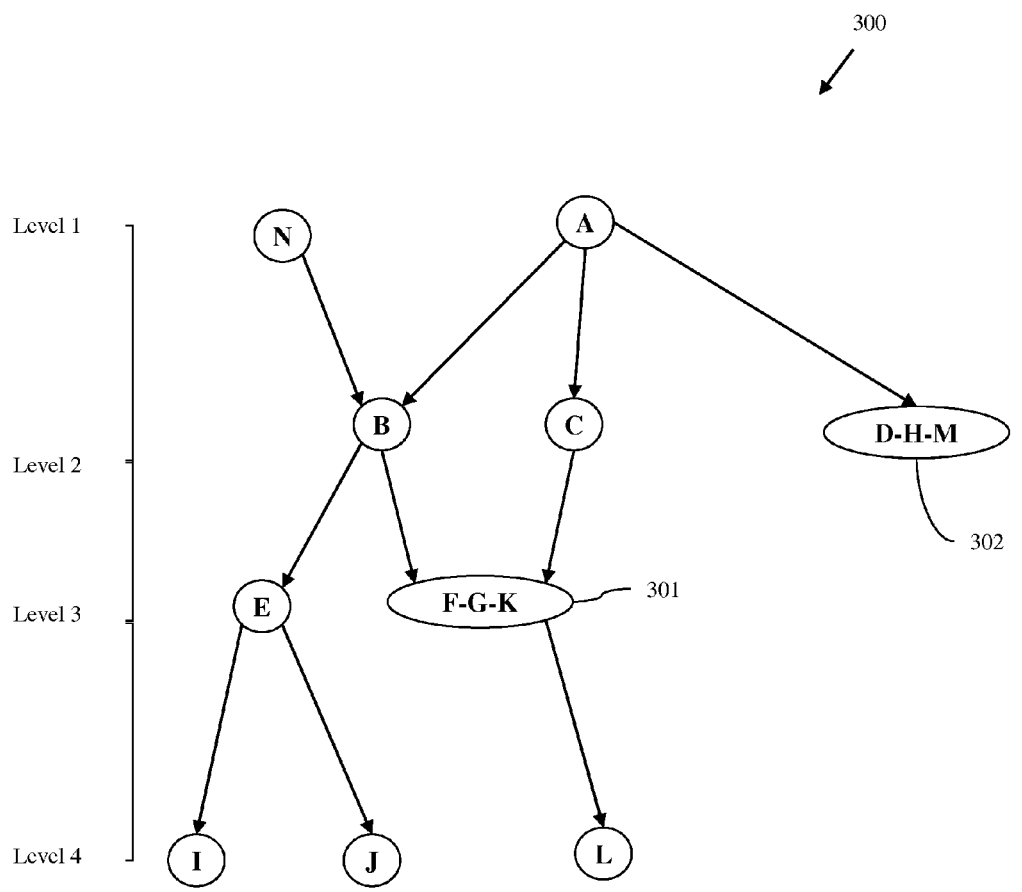
FIG. 3 is another exemplary dependency graph.

The results of this analysis can then be used to generate an updated dependency graph with each group of cyclically connected grammar rule nodes being represented by a combined grammar rule node such that the updated dependency graph is devoid of the cyclically connected grammar rule nodes (107). For example, as illustrated in the exemplary updated dependency graph 300 FIG. 3, the group of nodes F, K and G, which were cyclically connected in FIG. 2 can be combined into a single combined node 301 (also referred to herein as a collapsed node). Similarly, the group of nodes D, H and M, which were also cyclically connected in FIG. 2, can be combined (i.e., collapsed) into a single combined node 302. Since nodes N, A, B, C, E, I, J and L are not cyclically connected to any other nodes, they remain unchanged.

Partitioning 108 can then be performed automatically and logically based on the updated dependency graph and as specified in a set of partitioning heuristics (i.e., a set of logical rules for partitioning) (109). The set of partitioning heuristics can define, for example, the maximum number of nodes (including nodes that represent a single grammar rule and nodes that represent multiple cyclically connected grammar rules) per subset. Additionally, or alternatively, the set of partitioning heuristics can define, for example, the maximum total size for each subset. For example, one subset may include nodes that represent multiple single grammar rules and another subset may include a combined node that represents multiple cyclically connected grammar rules, but neither subset can have a size that is greater than the maximum total size. It should be noted that the maximum number of nodes and/or the maximum subset size can be dynamic. That is, the number of nodes and/or the subset size can be dependent on the ability of the target language compiler to compile the generated code for each subset.

Additionally, or alternatively, the set of partitioning heuristics can define a depth of the updated dependency graph at which the partitioning should begin. For example, referring to the levels 1-4 in the updated dependency graph 300 FIG. 3, a rule may specify that partitioning only occurs at one of the levels (e.g., level 3 and below). Additionally, or alternatively, the set of partitioning heuristics can specify different partitioning rules for different graph depths (i.e., hierarchical partitioning). Additionally, or alternatively, the set of partitioning heuristics can provide for breadth wise partitioning. That is, single nodes and combined nodes, which are in the same depth, can be portioned into different logical subsets as there are no dependencies in them. For example, take the case of a grammar dependency graph having the following edges: N1→N0 and N2→N0, N3→N1, N4→N1, N5→N1, N6→N2, N7→N2, N8→N2. Basic partitioning only permits a maximum of 5 nodes. With depth-wise partitioning (including all nodes in a depth before going to another depth), N0, N1, N2, N3, N4 will be in one logical subset and N5, N6, N7, N8 will be in another. Thus, related rules come together in one logical subset, but unrelated rules come together in the other. Packing unrelated rules together can, however, be bad for grammar maintenance, readability and compiling. Contrarily, with breadth wise partitioning, parent-child related grammar rules are packed into one subset, a situation which is good for grammar maintenance readability and compiling.

It should be understood that if it is determined that a single combined node (i.e., a collapsed node) violates at least one of the partitioning heuristics (e.g., a maximum total size rule), the dependency graph can be further updated so as to split the combined node (e.g., into single grammar rule nodes, into several combined grammar rule nodes, or a combination thereof). It should further be understood the above-discussed partitioning heuristics are offered for illustration purposes and any other default or user-specified partitioning heuristics could alternatively be employed in order to partition the set of grammar rules into logical subsets.

For each logical subset identified at process 108, textual code for a corresponding portion of a parsing program can be generated (110). Those skilled in the art will recognize that parsing programs are designed to be able to parse software code written in a particular programming language. Techniques for generating such parsing programs are well-known in the art and, thus, are omitted from this specification in order to allow the reader to focus on the salient aspects of the disclosed embodiments.

Then, for each logical subset, the textual code for the corresponding portion of the parsing program can be converted into machine-readable code for that corresponding portion of the parsing program (112). Those skilled in the art will recognize that the type of machine-readable code will vary depending upon the particular programming language. For example, for C or C++, the machine-readable code can comprise object code. Alternatively, for Java, the machine-readable code can comprise byte code contained within class files. Techniques for converting (i.e., translating) textual code into machine-readable code are well-known in the art and, thus, are omitted from this specification in order to allow the reader to focus on the salient aspects of the disclosed embodiments. Thus, rather than converting a relatively large amount of textual code for a parsing program into machine-readable code for that parsing program at process 112, relatively small amounts of textual code for portions of a parsing program can be discretely converted into machine-readable code for portions of that parsing program, thereby avoiding the "code too large" problem.

Then, all machine-readable code for all portions of the parsing program can be merged into a complete parsing program (114). Depending upon the language, the merged machine-readable code is either immediately executable as a parser (i.e., computer-executable code) or requires additional processing to be executable as a parser. For example, in the case of C or C++, object code is an assembly language and, thus, following process 114 the merged object code is computer-executable code. However, for Java, process 114 merges class files containing byte code into a jar file. This jar file is in turn readable by a Java Virtual Machine, which can interpret the jar file and, more particularly, convert the jar file into computer-executable code. Those skilled in the art will recognize that a Java Virtual Machine comprises software, which can be implemented on hardware and operating systems and which can execute Java bytecode.

Next, the parsing program (i.e., the parser) can be executed (e.g., by an operating system or virtual machine) (116) in order to parse a corpus (e.g., a text file of software code, which is for at least one program and which is written in a particular programming language) stored in memory.

Figure 4:
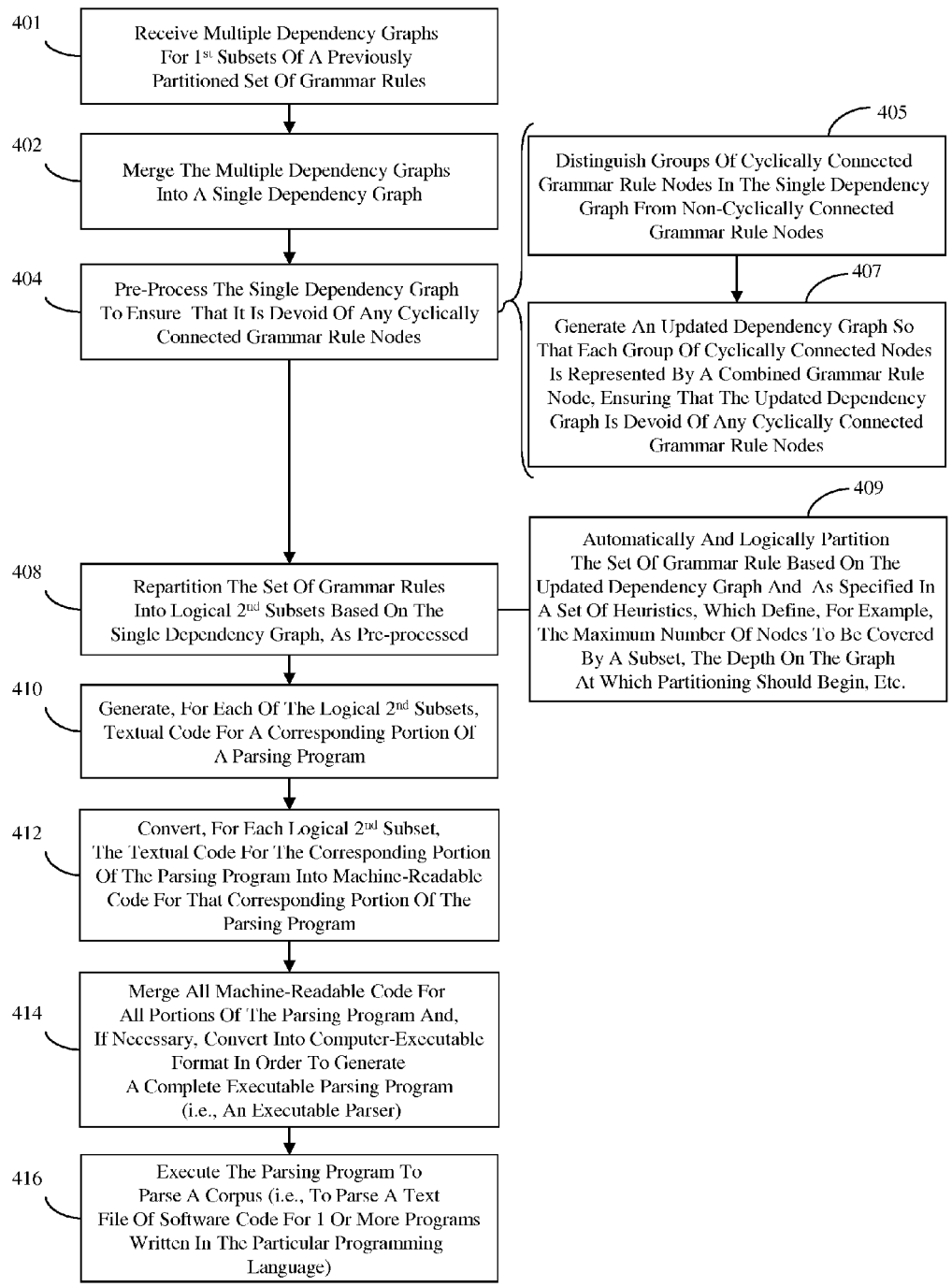
FIG. 4 is a flow diagram illustrating another embodiment of a method that provides for automatic programming language grammar partitioning.

Referring to FIG. 4, another embodiment of this computer-implemented method is specifically applicable when a programming language (e.g., Java, Basic, C, C++, structured query language (SQL), etc.) has already been partitioned but the resulting partitions (i.e., the subsets of the set of grammar rules) are insufficient (e.g., too large to solve the "code too large" problem or the grammar rules have evolved). In this case, the method can comprise receiving multiple dependency graphs corresponding to subsets of a set of grammar rules for a particular programming language, as previously partitioned (i.e., first subsets) (401). The multiple dependency graphs can be merged into a single dependency graph (402) and the single dependency graph can be preprocessed, in the same manner as described above, so that it is devoid of any cyclically connected grammar rule nodes (404).

Specifically, preprocessing 404 can be accomplished by first analyzing the single dependency graph in order to identify strongly connected nodes and, particularly, in order to distinguish the groups of cyclically connected grammar rule nodes in the initial dependency graph from non-cyclically connected grammar rule nodes (405). See the dependency graph 200 of FIG. 2 and the detailed discussion above. The results of this analysis can then be used to generate an updated dependency graph with each group of cyclically connected grammar rule nodes being represented by a combined grammar rule node such that the updated dependency graph is devoid of the cyclically connected grammar rule nodes (407). See the updated dependency graph 300 of FIG. 3 and the detailed discussion above.

After the single dependency graph is preprocessed at process 404, the set of grammar rules can be repartitioned into logical subsets (i.e., second subsets) based on the single dependency graph, as preprocessed (408). Specifically, repartitioning can be performed automatically and logically based on the updated dependency graph and as specified in a set of partitioning heuristics (i.e., a set of logical rules for partitioning) (409). As discussed in detail above, the set of partitioning heuristics can define, for example, the maximum number of nodes, the maximum total size for each subset, graph depth at which partitioning should begin, different partitioning rules for different graph depths, etc.

For each logical second subset identified at process 408, textual code for a corresponding portion of a parsing program can be generated (410). Those skilled in the art will recognize that parsing programs are designed to be able to parse software code written in a particular programming language. Techniques for generating such parsing programs are well-known in the art and, thus, are omitted from this specification in order to allow the reader to focus on the salient aspects of the disclosed embodiments.

Then, for each logical second subset, the textual code for the corresponding portion of the parsing program can be converted into machine-readable code for that corresponding portion of the parsing program (412). As mentioned above, those skilled in the art will recognize that the type of machine-readable code will vary depending upon the particular programming language. For example, for C or C++, the machine-readable code can comprise object code. Alternatively, for Java, the machine-readable code can comprise byte code contained within class files. Techniques for converting (i.e., translating) textual code into machine-readable code are well-known in the art and, thus, are omitted from this specification in order to allow the reader to focus on the salient aspects of the disclosed embodiments. Thus, rather than converting a relatively large amount of textual code for a parsing program into machine-readable code for that parsing program at process 412, relatively small amounts of textual code for portions of a parsing program can be discretely converted into machine-readable code for portions of that parsing program, thereby avoiding the "code too large" problem.

Then, all machine-readable code for all portions of the parsing program can be merged into a complete parsing program (414). As mentioned above, depending upon the language, the merged machine-readable code is either immediately executable as a parser (i.e., computer-executable code) or requires additional processing to be executable as a parser. For example, in the case of C or C++, object code is an assembly language and, thus, following process 114 the merged object code is computer-executable code. However, for Java, process 114 merges class files containing byte code into a jar file. This jar file is in turn readable by a Java Virtual Machine, which can interpret the jar file and, more particularly, convert the jar file into computer-executable code. Those skilled in the art will recognize that a Java Virtual Machine comprises software, which can be implemented on hardware and operating systems and which can execute Java bytecode.

Next, the complete parsing program (i.e., parser) can be executed (e.g., by an operating system or virtual machine) (416) in order to parse a corpus (e.g., a text file of software code, which is for at least one program and which is written in a particular programming language) stored in memory.

Figure 5:
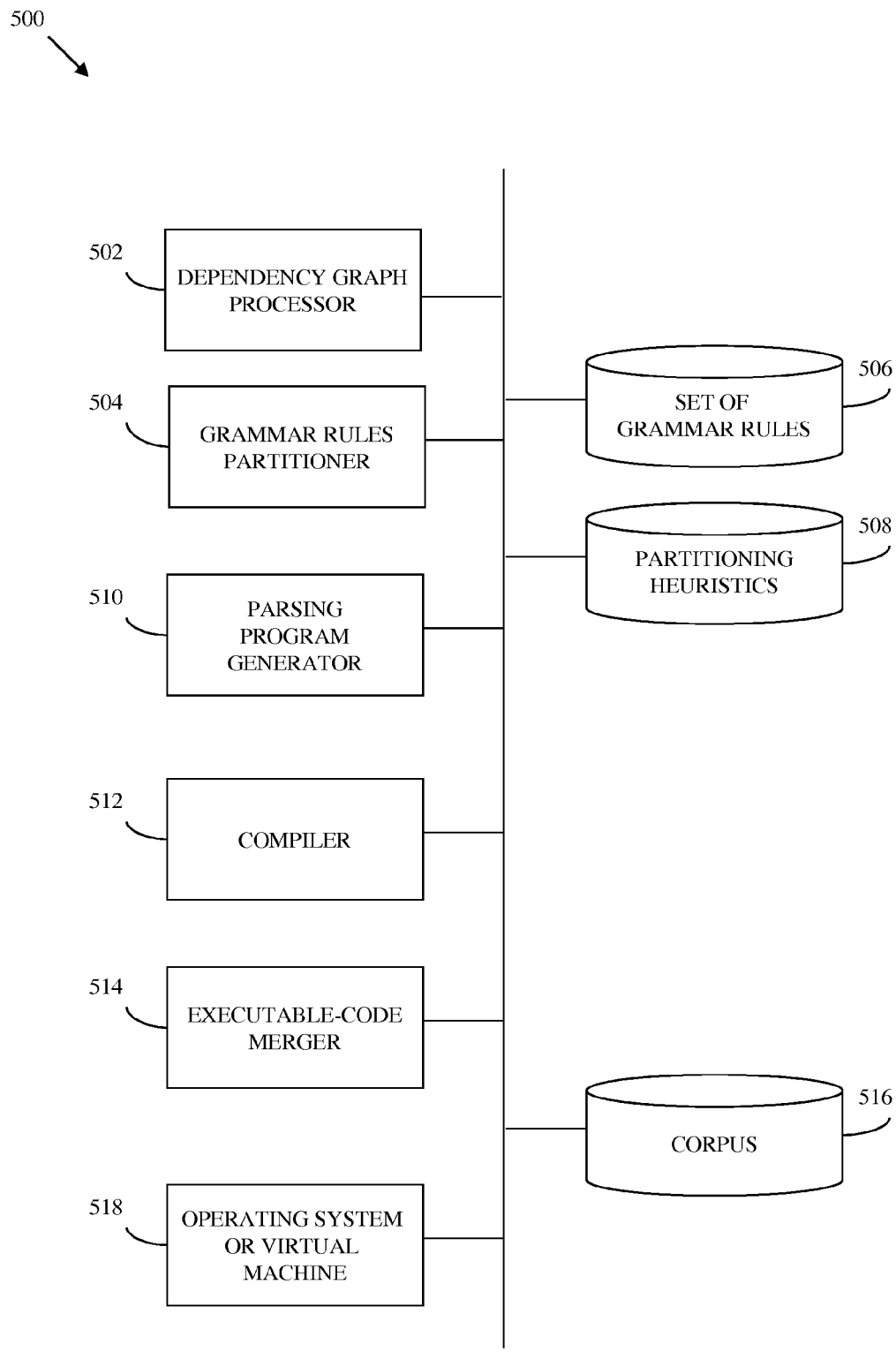
FIG. 5 is a schematic diagram illustrating embodiments of a system that provides for programming language grammar partitioning.

Also disclosed herein are embodiments of system 500, as shown in FIG. 5, that provides for automatic programming language grammar partitioning to solve the "code too large" problem. The system 500 can be implemented, for example, in a computer hardware environment such as that described in detail below and depicted in FIG. 6.

Figure 6:
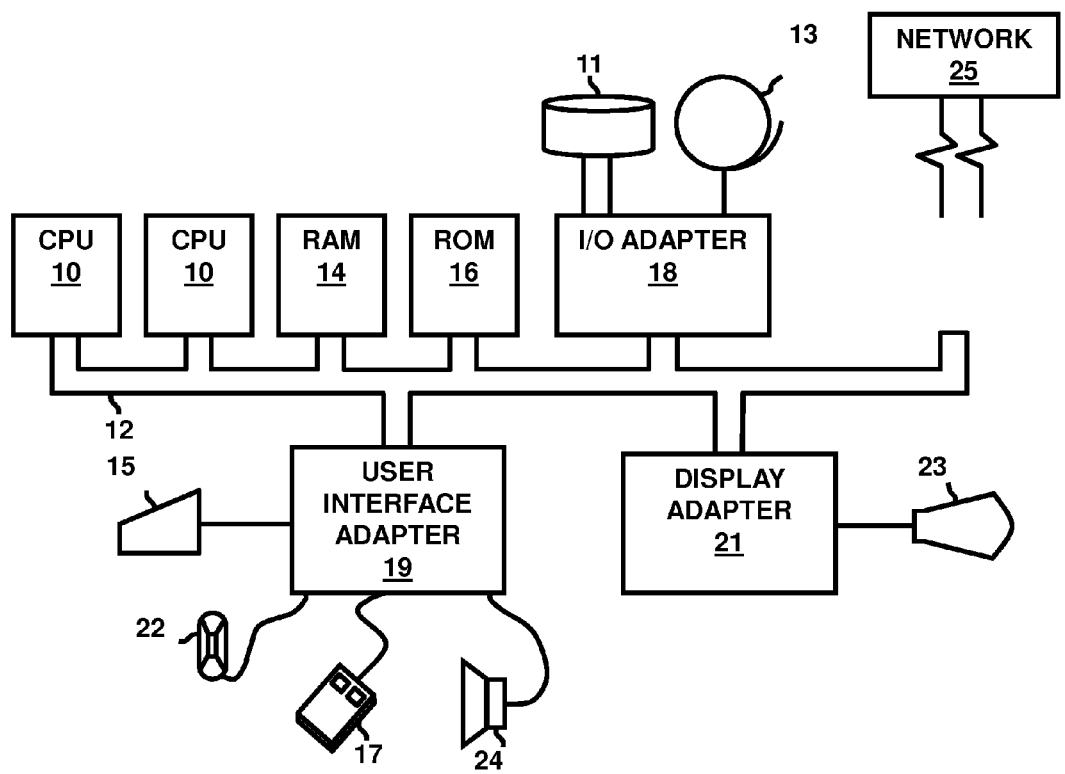
FIG. 6 is a schematic diagram illustrating an exemplary hardware environment that can be used to implement the disclosed embodiments.

Specifically, the system 500 embodiments can comprise at least one memory device and at least one computer processing unit (i.e., processor) in communication with the memory device, as shown in FIG. 6. Referring to FIG. 5, the memory device(s) can store (i.e., can be adapted to store, configured to store, etc.) at least a set of grammar rules 506 for a particular programming language (e.g., Java, Basic, C, C++, structured query language (SQL), etc.), a set of partitioning heuristics 508 (i.e., a set of logical rules for partitioning) and a corpus 516 (e.g., a text file of software code, which is for at least one program and which is written in a particular programming language). The processor(s) can comprise at least the following: a dependency graph processor 502, a grammar rules partitioner 504; a parsing program generator 510; a compiler 512; and a code merger 514.

In one embodiment of this system, the grammar rules partitioner 504 can partition (i.e., can be adapted to partition, configured to partition, programmed to partition, etc.) the set of grammar rules 506 into logical subsets based on a dependency graph for the particular programming language, where the dependency graph is preprocessed so as to be devoid of any cyclically connected grammar rule nodes.

To accomplish this, the dependency graph processor 502 can first generate (i.e., can be adapted to generation, configured to generate, programmed to generate, etc.) an initial dependency graph for the set of grammar rules in a particular programming language. Generally, in dependency graphs, grammar rule nodes describe particular non-terminals in the set of grammar rules. For example, consider a grammar rule A-B, C, D. There will be four nodes A, B, C, and D on the graph, if A, B, C, and D are all non-terminals. There will be edges from B to A, C to A and D to A. However, if C is a terminal (i.e., if no other rules exist that further define C), then C will not be represented on the graph. Processors capable of generating a dependency graph for a set of grammar rules in a particular programming language are well-known in the art and, thus, the details of omitted from this specification in order to allow the reader to focus on the salient aspects of the disclosed embodiments.

FIG. 2 illustrates an exemplary dependency graph 200 as generated by such a dependency graph processor 502. In this exemplary dependency graph 200, nodes A-N represent the grammar rules in a set of grammar rules. Nodes A and N are independent grammar rule nodes, as they do not depend on any other nodes. Nodes B-M are dependent grammar rule nodes, as they each depend from at least one other node.

Next, the dependency graph processor 502 can preprocess (i.e., can be adapted to preprocess, configured to preprocess, programmed to preprocess, etc.) the dependency graph so that it will be devoid of any cyclically connected grammar rule nodes. This preprocessing can be accomplished by first analyzing the graph in order to identify strongly connected nodes and, particularly, in order to distinguish the groups of cyclically connected grammar rule nodes in the initial dependency graph from non-cyclically connected grammar rule nodes. For example, as illustrated in the exemplary dependency graph of FIG. 2, the group 201 of nodes F, K and G are all cyclically connected (i.e., node K depends from node F, node G depends from node K and node F depends from node G), the group 202 of nodes D, H and M are all cyclically connected (i.e., node H depends from node D, node M depends from node H and node D depends from node M) and nodes N, A, B, C, E, I, J and L are not cyclically connected to any other nodes.

The dependency graph processor 502 can then use (i.e., can be adapted to use, configured to use, programmed to use, etc.) the results of this analysis to generate an updated dependency graph with each group of cyclically connected grammar rule nodes being represented by a combined grammar rule node such that the updated dependency graph is devoid of the cyclically connected grammar rule nodes. For example, as illustrated in the exemplary updated dependency graph 300 of FIG. 3, the group of nodes F, K and G, which were cyclically connected in FIG. 2 can be combined into a single combined node 301 (also referred to herein as a collapsed node). Similarly, the group of nodes D, H and M, which were also cyclically connected in FIG. 2, can be combined (i.e., collapsed) into a single combined node 302. Since nodes N, A, B, C, E, I, J and L are not cyclically connected to any other nodes, they remain unchanged.

The grammar rules partitioner 504 can then automatically and logically perform the partitioning process (i.e., can be adapted to automatically and logically perform the partitioning process, configured to automatically and logically perform the partitioning process, programmed to automatically and logically perform the partitioning process, etc.) based on the updated dependency graph and as specified in the stored set of partitioning heuristics 508. The set of partitioning heuristics can define, for example, the maximum number of nodes (including nodes that represent a single grammar rule and nodes that represent multiple cyclically connected grammar rules) per subset. Additionally, or alternatively, the set of partitioning heuristics can define, for example, the maximum total size for each subset. For example, one subset may include nodes that represent multiple single grammar rules and another subset may include a combined node that represents multiple cyclically connected grammar rules, but neither subset can have a size that is greater than the maximum total size. It should be noted that the maximum number of nodes and/or the maximum subset size can be dynamic. That is, the number of nodes and/or the subset size can be dependent on the ability of the target language compiler to compile the generated code for each subset.

Additionally, or alternatively, the set of partitioning heuristics can define a depth of the updated dependency graph at which the partitioning should begin. For example, referring to the levels 1-4 in the updated dependency graph 300 FIG. 3, a rule may specify that partitioning only occurs at one of the levels (e.g., level 3 and below). Additionally, or alternatively, the set of partitioning heuristics can specify different partitioning rules for different graph depths (i.e., hierarchical partitioning). Additionally, or alternatively, the set of partitioning heuristics can provide for breadth wise partitioning. That is, single nodes and combined nodes, which are in the same depth, can be portioned into different logical subsets as there are no dependencies in them. For example, take the case of a grammar dependency graph having the following edges: N1→N0 and N2→N0, N3→N1, N4→N1, N5→N1, N6→N2, N7→N2, N8→N2. Basic partitioning only permits a maximum of 5 nodes. With depth-wise partitioning (including all nodes in a depth before going to another depth), N0, N1, N2, N3, N4 will be in one logical subset and N5, N6, N7, N8 will be in another. Thus, related rules come together in one logical subset, but unrelated rules come together in the other. Packing unrelated rules together can, however, be bad for grammar maintenance, readability and compiling. Contrarily, with breadth wise partitioning, parent-child related grammar rules are packed into one subset, a situation which is good for grammar maintenance readability and compiling.

It should be understood that if it is determined by the grammar rule partitioner 504 that a single combined node (i.e., a collapsed node) violates at least one of the partitioning heuristic (e.g., a maximum total size rule), the dependency graph can be further updated so as to split the combined node (e.g., into single grammar rule nodes, into several combined grammar rule nodes, or a combination thereof). It should further be understood the above-discussed partitioning heuristics are offered for illustration purposes and any other default or user-specified partitioning heuristics could alternatively be employed in order to partition the set of grammar rules into logical subsets.

For each logical subset, the parsing program generator 510 can then generate (i.e., can be adapted to generate, configured to generation, programmed to generate, etc.) textual code for a corresponding portion of a parsing program. Those skilled in the art will recognize that parsing programs generated by such parsing program generators are designed to be able to parse software code written in a particular programming language. Parsing program generators are well-known in the art and, thus, the details of such parsing program generators are omitted from this specification in order to allow the reader to focus on the salient aspects of the disclosed embodiments.

For each logical subset, the compiler 512 can discretely convert or, more particularly, discretely translate (i.e., can be adapted to translate, configured to translate, programmed to translate, etc.) the textual code for the corresponding portion of the parsing program into machine-readable code for that corresponding portion of the parsing program. As mentioned above, those skilled in the art will recognize that the type of machine-readable code will vary depending upon the particular programming language. For example, for C or C++, the machine-readable code can comprise object code. Alternatively, for Java, the machine-readable code can comprise byte code contained within class files. Thus, rather than converting a relatively large amount of textual code for a parsing program into machine-readable code for that parsing program, the compiler 512 discretely converts relatively small amounts of textual code for portions of a parsing program into machine-readable code for those portions of the parsing program, thereby avoiding the "code too large" problem. Compilers (i.e., computer processors) that execute compiling programs in order to compile (i.e., translate) textual code into machine-readable code are well-known in the art and, thus, details of such compilers are omitted from this specification in order to allow the reader to focus on the salient aspects of the disclosed embodiments.

Next, the code merger 514 can merge all machine-readable code for all portions of the parsing program into a complete parsing program. As mentioned above, depending upon the language, the merged machine-readable code is either immediately executable as a parser (i.e., computer-executable code) or requires additional processing to be executable as a parser. For example, in the case of C or C++, object code is an assembly language and, thus, following process 114 the merged object code is computer-executable code. However, for Java, process 114 merges class files containing byte code into a jar file. This jar file is in turn readable by a Java virtual machine, which can interpret the jar file and, more particularly, convert the jar file into computer-executable code. Those skilled in the art will recognize that a Java Virtual Machine comprises software, which can be implemented on hardware and operating systems and which can execute Java bytecode.

The system 500 can further comprise a component 518, such as an operating system or a virtual machine (e.g., a Java Virtual Machine), that executes (i.e., that is adapted to execute, configured to execute, programmed to execute, etc.) the executable parsing program (i.e., the executable parser) in order to parse the corpus 516. That is, the executable parsing program (i.e., the parser) is executed to parse the corpus (i.e., the software code, which is for at least one program and which is written in a particular programming language) in order to check the syntax of that software code, which is written in that particular programming language (e.g., Basic, C, C++, structured query language (SQL), etc.). Parsers are well-known in the art and, thus, details of such parsers are omitted from this specification in order to allow the reader to focus on the salient aspects of the disclosed embodiments.

Another embodiment of the system 500 is specifically applicable when a programming language (e.g., Java, Basic, C, C++, structured query language (SQL), etc.) has already been partitioned but the resulting partitions (i.e., the subsets of the set of grammar rules) are insufficient (e.g., too large to solve the "code too large" problem or the grammar rules have evolved). In this case, the dependency graph processor 502 can receive (i.e., can be adapted to receive, configured to receive, etc.) multiple dependency graphs corresponding to subsets of a set of grammar rules for a particular programming language, as previously partitioned (i.e., first subsets). The dependency graph processor 502 can further merge (i.e., can be adapted to merge, configured to merge, programmed to merge, etc.) the multiple dependency graphs into a single dependency graph. Finally, the dependency graph processor 502 can preprocess (i.e., can be adapted to preprocess, configured to preprocess, programmed to preprocess, etc.) the single dependency graph, in the same manner as described above, so that it is devoid of any cyclically connected grammar rule nodes.

Specifically, the dependency graph processor 502 can first analyze the single dependency graph in order to identify strongly connected nodes and, particularly, in order to distinguish the groups of cyclically connected grammar rule nodes in the initial dependency graph from non-cyclically connected grammar rule nodes. See FIG. 2 and the detailed discussion above. The dependency graph processor 502 can further use the results of this analysis to generate an updated dependency graph with each group of cyclically connected grammar rule nodes being represented by a combined grammar rule node such that the updated dependency graph is devoid of the cyclically connected grammar rule nodes. See FIG. 3 and the detailed discussion above.

The grammar rules partitioner 504 can then re-partition (i.e., can be adapted to repartition, configured to repartition, programmed to repartition, etc.) the set of grammar rules into logical subsets (i.e., second subsets) based on the single dependency graph, as preprocessed. Specifically, the grammar rules partitioner 504 can automatically and logically repartition the set of grammar rules based on the updated dependency graph and as specified in the stored set of partitioning heuristics 508. As discussed in detail above, the set of partitioning heuristics can define, for example, the maximum number of nodes, the maximum total size for each subset, graph depth at which partitioning should begin, different partitioning rules for different graph depths, etc.

After repartitioning is performed by the grammar rules partitioner 504, processing can continue in the same manner as described above. That is, for each logical subset, the parsing program generator 510 can then generate textual code for a corresponding portion of a parsing program and the compiler 512 can discretely convert (i.e., can be adapted to convert, can be configured to convert, can be programmed to convert, etc.) the textual code for the corresponding portion of the parsing program into machine-readable code for that corresponding portion of the parsing program. As mentioned above, those skilled in the art will recognize that the type of machine-readable code will vary depending upon the particular programming language. For example, for C or C++, the machine-readable code can comprise object code. Alternatively, for Java, the machine-readable code can comprise byte code contained within class files. Thus, rather than converting a relatively large amount of textual code for a parsing program into machine-readable code for that parsing program, the compiler 512 discretely converts relatively small amounts of textual code for portions of a parsing program into machine-readable code for those portions of the parsing program, thereby avoiding the "code too large" problem.

Next, the code merger 514 can merge (i.e., can be adapted to merge, can be configured to merge, can be programmed to merge, etc.) all machine-readable code for all portions of the parsing program into a complete parsing program. As mentioned above, depending upon the language, the merged machine-readable code is either immediately executable as a parser (i.e., computer-executable code) or requires additional processing to be executable as a parser. For example, in the case of C or C++, object code is an assembly language and, thus, following the merging process performed by the code merger, the merged object code is computer-executable code. However, for Java, the code merger 514 merges class files containing byte code into a jar file. This jar file is in turn readable by a Java Virtual Machine, which can interpret the jar file and, more particularly, convert the jar file into computer-executable code. Those skilled in the art will recognize that a Java Virtual Machine comprises software, which can be implemented on hardware and operating systems and which can execute Java bytecode.

Again, the system 500 can further comprise a component 518, such as an operating system or a virtual machine (e.g., a Java Virtual Machine), that executes (i.e., that is adapted to execute, configured to execute, programmed to execute, etc.) the executable parsing program (i.e., the executable parser) in order to parse the corpus 516. That is, the executable parsing program (i.e., the parser) is executed to parse the corpus (i.e., the software code, which is for at least one program and which is written in a particular programming language) in order to check the syntax of that software code, which is written in that particular programming language (e.g., Basic, C, C++, structured query language (SQL), etc.). Parsers are well-known in the art and, thus, details of such parsers are omitted from this specification in order to allow the reader to focus on the salient aspects of the disclosed embodiments.

As described above and illustrated in FIG. 5, the system components (e.g., dependency graph processor 502, grammar rules partitioner 504, parsing program generator 510, compiler 512, code merger 514 and operating system and/or virtual machine 518) can be implemented by discrete units (e.g., discrete computer systems or discrete computer processing units (i.e., discrete processors). However, alternatively, any two or more of these components can be implemented by a single unit (e.g., by a single computer system or by a single computer processing unit (i.e., a single processor)). Similarly, as described above and illustrated in FIG. 5, the stored information (e.g., set of grammar rules 506, partitioning heuristics 508 and corpus 516) can be stored by discrete memories. However, alternatively, any of this stored information can be stored on the same memory.

Also disclosed herein are embodiments of a program storage device that is readable by a computer and that tangibly embodies a program of instructions executable by the computer to perform the above-described method. More particularly, as will be appreciated by one skilled in the art, aspects of the disclosed embodiments may be embodied as a system, method or computer program product. Accordingly, aspects of the disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed embodiments may take the form of a computer program product embodied in at least one computer readable medium having computer readable program code embodied thereon.

Any combination of at least one computer readable medium may be utilized. The computer readable medium may be a computer readable storage medium or a computer readable signal medium. The computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible storage device that can contain, or store a program for use by or in connection with an instruction execution system, apparatus, or device. The computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products according to the disclosed embodiments. It should be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As mentioned above, the representative hardware environment for practicing the disclosed method, system and program storage device embodiments is depicted in FIG. 6. This schematic drawing illustrates a hardware configuration of an information handling/computer system in accordance with the embodiments disclosed herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of disclosed embodiments. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing the disclosed embodiments only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of at least one other feature, integer, step, operation, element, component, and/or groups thereof. It should further be understood that the corresponding structures, materials, acts, and equivalents of all means or step plus function elements in the claims below are intended to include any structure, material, or act for performing the function in combination with other claimed elements as specifically claimed.

Finally, it should be understood that the disclosed embodiments have been presented for purposes of illustration and description, but are not intended to be exhaustive or limiting in the form disclosed. Many modifications and variations to the disclosed embodiments will be apparent to those of ordinary skill in the art without departing from the scope and spirit thereof. The embodiments were chosen and described in order to best explain the disclosed principles, the practical application of those principles, and to enable others of ordinary skill in the art to understand the various embodiments with various modifications as are suited to the particular use contemplated.

Therefore, disclosed above are embodiments a computer-implemented method, a system and an associated program storage device that provide for automatic programming language grammar partitioning to solve the "code too large" problem. Specifically, the embodiments partition a particular programming language grammar (i.e., the set of grammar rules for the particular programming language) into logical subsets based on a set of partitioning heuristics and using a dependency graph that is preprocessed so as to be devoid of any cyclically connected grammar rule nodes. For each logical subset, textual code for a corresponding portion of a parsing program can be generated (e.g., by a parsing program generator) and then converted (e.g., by a compiler) into machine-readable code for that corresponding portion of the parsing program. Thus, rather than converting a relatively large amount of textual code for a parsing program into machine-readable code for that parsing program, relatively small amounts of textual code for portions of a parsing program are discretely converted into machine-readable code for portions of that parsing program, thereby avoiding the "code too large" problem. The machine-readable code for all portions of the parsing program can then be merged (e.g., by a code merger) in order to generate a complete executable parsing program (i.e., an executable parser) and the executable parsing program can be executed in order to parse a corpus (e.g., a text file of software code, which is for at least one program and which is written in a particular programming language).

What is claimed is:

1. A method comprising:
preprocessing, by a computer, a dependency graph corresponding to a set of grammar rule nodes for a particular programming language in order to generate an updated dependency graph, said preprocessing comprising, for each group of cyclically connected grammar rule nodes in said dependency graph, combining said group so that said group is represented in said updated dependency graph by a single grammar rule node and so that said updated dependency graph is devoid of cyclically connected grammar rule nodes;
partitioning, by said computer, said set of grammar rules for said particular programming language into logical subsets based on said updated dependency graph;
generating, by said computer and for each one of said logical subsets, textual code for a corresponding portion of a parsing program;
converting, by said computer for each one of said logical subsets, said textual code for said corresponding portion of said parsing program into machine-readable code for said corresponding portion of said parsing program; and
merging, by said computer, all machine-readable code for all portions of said parsing program.

2. The method of claim 1, further comprising executing, by said computer and after said merging, said parsing program to parse a corpus.

3. The method of claim 2, said corpus comprising a text file of software code for at least one program written in said particular programming language.

4. The method of claim 1, further comprising, before said partitioning,
generating, by said computer, said dependency graph for said particular programming language;
distinguishing, by said computer, groups of cyclically connected grammar rule nodes in said dependency graph from non-cyclically connected grammar rule nodes in said dependency graph; and,
after said distinguishing, performing said preprocessing.

5. The method of claim 4, said partitioning being performed automatically and logically based on said updated dependency graph and as specified in a set of heuristics, said set of heuristics defining at least one of:
a maximum number of nodes per subset; and
a depth of said updated dependency graph at which said partitioning should begin.

6. A system comprising:
at least one memory device storing a set of grammar rules for a particular programming language and a corpus; and
at least one processor in communication with said memory device and comprising:
a dependency graph processor preprocessing a dependency graph corresponding to a set of grammar rule nodes for a particular programming language in order to generate an updated dependency graph, said preprocessing comprising, for each group of cyclically connected grammar rule nodes in said dependency graph, combining said group so that said group is represented in said updated dependency graph by a single grammar rule node and so that said updated dependency graph is devoid of cyclically connected grammar rule nodes;
a grammar rules partitioner partitioning said set of grammar rules into logical subsets based on said updated dependency graph for said particular programming language;
a parsing program generator generating, for each one of said logical subsets, textual code for a corresponding portion of a parsing program;
a compiler converting, for each one of said logical subsets, said textual code for said corresponding portion of said parsing program into machine-readable code for said corresponding portion of said parsing program; and
a code merger merging all machine-readable code for all portions of said parsing program.

7. The system of claim 6, further comprising at least one of an operating system and a virtual machine executing, after said merging by said code merger, said parsing program to parse a corpus.

8. The system of claim 7, said corpus comprising a text file of software code for at least one program written in said particular programming language.

9. The system of claim 6, said dependency graph processor performing the following:
generating said dependency graph for said particular programming language;
distinguishing groups of cyclically connected grammar rule nodes in said dependency graph from non-cyclically connected grammar rule nodes in said dependency graph; and,
after said distinguishing, performing said preprocessing.

10. The system of claim 9, said partitioning being performed by said grammar rules partitioner automatically and logically based on said updated dependency graph and as specified in a set of heuristics, said set of heuristics defining at least one of:
a maximum number of nodes per subset; and
a depth of said updated dependency graph at which said partitioning should begin.

11. A method comprising:
receiving, by a computer, multiple dependency graphs corresponding to first subsets of a set of grammar rules for a particular programming language;
merging, by said computer, said multiple dependency graphs into a single dependency graph;
preprocessing, by said computer, said single dependency graph to generate an updated dependency graph, said preprocessing comprising, for each group of cyclically connected grammar rule nodes in said single dependency graph, combining said group so that said group is represented by a single grammar rule node and so that said updated dependency graph is devoid of cyclically connected grammar rule nodes;
repartitioning, by said computer, said set of grammar rules into logical second subsets based on said updated dependency graph;
generating, by said computer for each of said logical second subsets, textual code for a corresponding portion of a parsing program;
converting, by said computer for each one of said logical second subsets, said textual code for said corresponding portion of said parsing program into machine-readable code for said corresponding portion of said parsing program; and
merging, by said computer, all machine-readable code for all portions of said parsing program.

12. The method of claim 11, further comprising executing, by said computer and after said merging, said parsing program to parse a corpus.

13. The method of claim 12, said corpus comprising a text file of software code for at least one program written in said particular programming language.

14. The method of claim 11, said preprocessing comprising:
distinguishing, by said computer, groups of cyclically connected grammar rule nodes in said single dependency graph from non-cyclically connected grammar rule nodes in said single dependency graph; and
after said distinguishing, performing said preprocessing.

15. The method of claim 14, said repartitioning being performed automatically and logically based on said updated dependency graph and as specified in a set of heuristics, said set of heuristics defining at least one of:
a maximum number of nodes per subset; and
a depth of said updated dependency graph at which said partitioning should begin.

16. A system comprising:
at least one memory device storing a set of grammar rules for a particular programming language and a corpus; and
at least one processor in communication with said memory device and comprising:
a dependency graph processor receiving multiple dependency graphs corresponding to first subsets of said set of grammar rules, merging said multiple dependency graphs into a single dependency graph, and preprocessing said single dependency graph to generate an updated dependency graph, said preprocessing comprising, for each group of cyclically connected grammar rule nodes in said single dependency graph, combining said group so that said group is represented by a single grammar rule node and so that said updated dependency graph is devoid of cyclically connected grammar rule nodes;

a grammar rules partitioner repartitioning said set of grammar rules into logical second subsets based on said updated dependency graph;

a parsing program generator generating, for each one of said logical second subsets, textual code for a corresponding portion of a parsing program;

a compiler converting, for each one of said logical second subsets, said textual code for said corresponding portion of said parsing program into machine-readable code for said corresponding portion of said parsing program; and a code merger merging all machine-readable code for all portions of said parsing program.

17. The system of claim 16, further comprising at least one of an operating system and a virtual machine executing, after said merging by said code merger, said parsing program to parse a corpus.

18. The system of claim 17, said corpus comprising a text file of software code for at least one program written in said particular programming language.

19. The system of claim 16, said dependency graph processor further:

distinguishing groups of cyclically connected grammar rule nodes in said single dependency graph from non-cyclically connected grammar rule nodes in said single dependency graph; and after said distinguishing, performing said preprocessing.

20. The system of claim 19, said repartitioning being performed by said grammar rules partitioner automatically and logically based on said updated dependency graph and as specified in a set of heuristics, said set of heuristics defining at least one of:

a maximum number of nodes per subset; and a depth of said updated dependency graph at which said partitioning should begin.

21. A non-transitory program storage device readable by a computer and tangibly embodying a program of instructions executable by said computer to perform a method, said method comprising:

preprocessing a dependency graph corresponding to a set of grammar rule nodes for a particular programming language in order to generate an updated dependency graph, said preprocessing comprising, for each group of cyclically connected grammar rule nodes in said dependency graph, combining said group so that said group is represented in said updated dependency graph by a single grammar rule node and so that said updated dependency graph is devoid of cyclically connected grammar rule nodes;

partitioning said set of grammar rules for said particular programming language into logical subsets based on said updated dependency graph;

generating, for each one of said logical subsets, textual code for a corresponding portion of a parsing program;

converting, for each one of said logical subsets, said textual code for said corresponding portion of said parsing program into machine-readable code for said corresponding portion of said parsing program; and merging all machine-readable code for all portions of said parsing program.

22. The program storage device of claim 21, said method further comprising, after said merging, executing said parsing program to parse a corpus.

23. The program storage device of claim 22, said corpus comprising a text file of software code for at least one program written in said particular programming language.

24. The program storage device of claim 21, said method further comprising, before said partitioning:

generating said dependency graph for said particular programming language;

distinguishing groups of cyclically connected grammar rule nodes in said dependency graph from non-cyclically connected grammar rule nodes in said dependency graph; and after said distinguishing, performing said preprocessing.

25. The program storage device of claim 24, said partitioning being performed by said grammar rules partitioner automatically and logically based on said updated dependency graph and as specified in a set of heuristics, said set of heuristics defining at least one of:

a maximum number of nodes per subset; and a depth of said updated dependency graph at which said partitioning should begin.

* * * * *